INVENTOR
LESTER M. LARSON

United States Patent Office 3,809,600
Patented May 7, 1974

3,809,600
THERMOPLASTIC SPLINT OR CAST
Lester M. Larson, 4619 Bailey Drive, Limestone Acres, Wilmington, Del. 19808
Continuation-in-part of application Ser. No. 683,016, Nov. 14, 1967, now Patent No. 3,490,444. This application Jan. 16, 1970, Ser. No. 3,474
The portion of the term of the patent subsequent to Jan. 20, 1987, has been disclaimed
Int. Cl. A61f 5/40
U.S. Cl. 161—109
12 Claims

ABSTRACT OF THE DISCLOSURE

Polydiene sheet material useful as a body supporting member such as a cast or splint, heat softenable at a higher than body temperature, but slowly recrystallizable or hardenable below about 40° C., treated by distributing throughout the substance small pores, perforations or surface irregularities as by foaming all or only one surface portion of the sheet material, particularly texturing, knurling, pocking or cratering the surface to be placed adjacent to the body member to be encased to allow moisture and/or air transfer away from the enclosed body surface.

---

This invention is a continuation-in-part of my copending application, Ser. No. 683,016, filed Nov. 14, 1967, and now 3,490,444.

This invention relates to improved materials for forming body supporting casts or splints from thermoplastic sheets and tapes which become self adherent and moldable to desired body supporting shape when softened by moderate heat and slowly harden by crystallization to a firm, non-brittle plastic splint or tape upon cooling to approximate body temperatures such as heating above 65° C. to soften them and cooling to below about 40° C. to allow crystallization or hardening of its polymer substances.

More particularly, this invention provides surface irregularities, perforations or a porous texture upon at least the surface upon the sheet material adapted to lie adjacent to the body part to be encased by the sheath or splint which is made porous.

In a prior invention, Canadian Pat. 746,291, dated Nov. 15, 1966, whose substance is here incorporated by reference, certain polydienes, typically, transpolyisoprene such as natural balata essentially freed of natural resins by precipitation, its synthetic form transpolyisoprene, as well as low temperature polymerized polychloroprene are shown to be useful plastic substances in sheet or tape form for forming body member supporting casts and splints. It was proposed in my prior patent that these selected polymers be heated to a temperature usually exceeding about 65° C. and up to about 110° C., whereby they become soft, self-coherent and pliable, sufficient to be deformed and shaped as a cast or spint about a body member broken or deformed or otherwise requiring mechanical support or protection. The sheets or tapes after shaping and applying to the body member are then cooled in situ in the desired shaped or deformed position about the body member to be supported, to below about 40° C., such as body temperature, whereby the so-shaped formed plastic sets by slowly crystallizing to assume a rigid form as a useful body support member.

In my prior copending application, Ser. No. 683,016, now Pat. No. 3,490,444, the tendency of these sheet and tape materials to develop a creep or plastic flow over substantial prolonged periods of use when so emplaced as a body member support was discovered, which is undesirable in body splint, cast or other body support member. Particularly in uses where close support is needed, the support has its tendency to lose its immediate utility as a form setting shape.

That tendency of the support to become slightly deformed in use was overcome by including reinforcing fiber materials in the plastic body. Such plastic was also improved by having its surface protected with adhesive coating members which may be applied with a pressure-sensitive adhesive for subsequent removal before use, which protects the fresh polymeric support material in unoxidized, fresh, unaged condition. Various useful coatings for that purpose are described and claimed, the further substance of the disclosure of that parent application being here incorporated by reference.

It is now found according to the present invention that the plastic sheet material lying flat on the surface of a body member tends to trap moisture upon the skin of the user, which is a source of irritation, discomfort and sometimes of source of contamination of the skin surface of the encased body member. In some types of splints such as hand splints, the accumulated moisture provides a slimey irritated feeling to the user-wearer.

According to the present invention, the skin discomfort generally due to moisture is removed or reduced by several alternate structural modifications in the surface and possibly also the body of the sheet material.

In one modification, the surface may be made irregular whether by texturing, knurling, cratering with half pocks pressed or cut therein, whereby the normally smooth film of moisture on the skin is interrupted. Thereby, any liquid skin accumulations not only are interrupted, but the liquid may seep into the surface irregularities to avoid formation on the skin of the continuous uncomfortable slimey film.

Where the sheet has been reinforced with fiber so that perforation will not substantially destroy the inherent strength of the sheath plastic, then it may be perforated with close set perforations to provide the adequate porosity for substantial evolution of moisture outward through the plastic from the skin surface.

In a third alternate, the body of the sheet may be treated with a foaming or gas-blowing agent whereby the entire sheet of plastic will foam when heated sufficient to soften it. In another procedure, one or both surfaces of the plastic are treated with a foaming agent such as by wetting the surface with a solvent, whereby upon subsequent heating to soften the sheet it develops a surface porosity or foam. Such surface porosity besides allowing escape of evolving moisture from the skin surface of the encased body member into the pores of the porous texture, also provides a comforting resiliency or softness against the skin of the body member which better conforms the support to the shape of the body member while also providing a softening, skin comforting encasement. Nevertheless, such plastic sheet is foamed, softened and set in foamed condition about the body member, whereby it provides both the absorption and/or allows escape of skin moisture and the adequate strength needed for splint reenforcement of the body member thus encased.

The invention is further described with reference to the drawings wherein.

Figure 1:
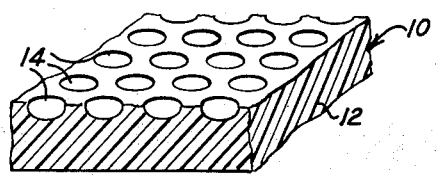
FIG. 1 shows the plastic support as sheet material formed with surface irregularities consisting of cup-like craters formed therein.
Figure 2:
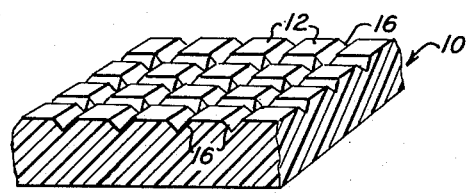
FIG. 2 shows a similar sheet material wherein the surface irregularities are knurlings.
Figure 3:
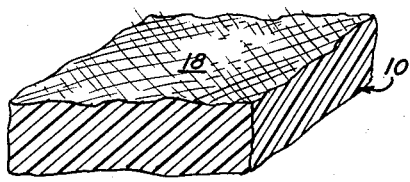
FIG. 3 shows the same sheet material wherein the surface is textured.

As shown in the drawings of FIG. 1, 2 or 3, the surface 12 of the sheet 10 has cup-like craters 14 impressed into the softened surface, each depression forming a cavity in which moisture in contact with the skin surface will accumulate, providing both an air space and cavities to accept and store exuded moisture from the skin surface. The cup-like cavities are quite closely spaced, usually less than one quarter on center to provide optimum moisture storage capacity.

The application of the same moisture storage principle is shown in the structures of FIGS. 2 and 3. In FIG. 2 the sheet 10 has knurlings 16 cut into the surface 12 which provide grooved cavities which can occlude and store the slimy moisture. FIG. 3 provides a roughened surface 18 referred to as textured, generally formed by blowing fine, needle-like blasts of air evenly over the surface and which penetrate the softened surface sufficient to provide the moisture storage surface irregularities. A similar effect of texturing can be obtained by other methods such as pressing the softened plastic against a desirably-shaped surface such as coarse woven cloth which itself may be formed of stiffened fiber to create negative fibrous impressions within the soft plastic surface.

Figure 4:
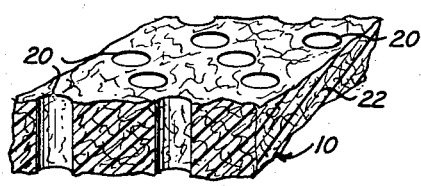
FIG. 4 illustrates fiber-reenforced plastic sheet having close perforations cut entirely through the thickness thereof.

As shown in FIG. 4, the plastic sheet 10 can be perforated with closely spaced perforations 20. The closely spaced perforations are spaced from 1/16 to 1/4 inch apart and tend correspondingly to weaken the plastic sheet so that in this instance the plastic sheet will be fiber reenforced by fibers 22 incorporated within the fiber sheet, sufficient to provide the extra strength to allow the body to be perforated with perforations from about 1 to 10% of the volume of the body 10.

Figure 5:
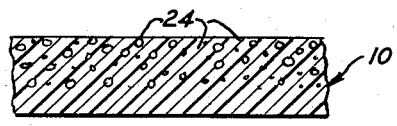
FIG. 5 illustrates the plastic sheet having one surface foamed.
Figure 7:
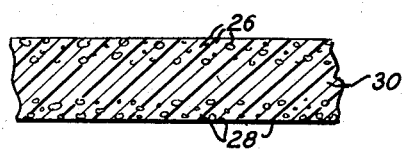
FIG. 7 illustrates a sheet in which only both opposite surfaces of the sheet are foamed.

Another desirable form of surface irregularity is to provide body pores in the sheet, such as by foaming. The foam or cellular surface is a softer resilient body contour-conforming surface which provides air spaces extending progressively from the surface in contact with the skin inward of the plastic sheet to allow absorption of moisture and a softer surface texture. Merely foaming to provide gas spaces 24 in one surface of the sheet 10, as shown in FIG. 5, may be adequate for much of this function. However, as shown in FIG. 7, it is sometimes commercially more feasible to foam both sides of the sheet 26 and 28 by dipping the polymer sheet in a solvent material which, upon subsequent heating, causes the dried sheet A to develop the pores in both surfaces 26 and 28. The center portion 30 of the plastic body does not need to contain pores and, consequently, may remain as mere sheet reenforcement.

Figure 6:
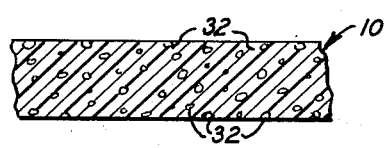
FIG. 6 illustrates the same plastic sheet wherein the entire body has been homogeneously foamed.

As shown in FIG. 6, the plastic body 10 may also be formed with pores 32 distributed homogeneously throughout the body. This may be done by forming the sheet as a foamed body so that its foamed texture is not modified in any way during conversion by softening of the sheet from sheet form to molded splint or cast form enclosing the body member.

Figure 8:
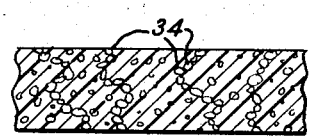
FIG. 8 illustrates a sheet wherein the foamed pores are interconnected.

As shown in FIG. 8, the foamed pores may be interconnected air spaces 34 extending from surface to surface of the plastic so that the foamed body allows "breathing" to transfer moisture from the skin of the encased body member to the outside of the cast.

The invention is further described with respect to the examples which illustrate the practice of this invention.

EXAMPLE I

Precipitated balata (purified natural transpolyisoprene) is blended on a two roll mill at about 90° C. for fifteen minutes in a ratio of 100 parts of polymer per 2 parts of cotten linters, 10 parts of finely-powdered titanium dioxide and one-half part of antioxidant as described in my parent application. The sheets obtained from the mill were molded in a frame to 130 mils thickness of approximately 12 inch square dimensions. The compressed sheets were then removed from the frame and perforated with one-sixteenth of an inch in diameter perforations spaced a distance of about one-quarter inch, the perforations extending from surface to surface as shown in enlarged detail in FIG. 4.

In forming the splint the sheet was dipped in a water bath for a half minute at a temperature just below boiling, about 95° C., and held therein, then withdrawn and cut into a deformable pattern with a pair of scissors to correspond to the contours of the wrist and fingers to be encased. The softened sheet was then applied about the wrist and fingers and molded into place closely about each joint and bony deformation by pressing against the body member. The contiguous cut parts of the splint were cohered into a unit by slight pressure and all rough edges were removed, smoothing with slight pressure. During the formation and shaping, if a longer time is needed to effect the perfect fitting of the cast, it may be slightly rewarmed by again dipping into the hot water bath or locally heated with a warm surface or a jet of hot air. The emplaced and formed cast will set merely by holding the hand with the cast thereon quiescent for fifteen to thirty minutes, but the setting process can be accelerated by dipping the encased member in ice water. It is to be noted that the sheets can be deformed over joints by manually working with applied pressure to fit closely about the contours of bony projections, etc., and after having set with cooling to body temperature, this splint was found to be dimensionally stable, and close fitting, without irritation of bony projections typical of the hand and wrist for as long as in use. After completion and setting of the splint, undesirable edges resulting from cutting may be softened by warming the splint edges only and then manually smoothing. The splint is so permanent that it can be used for years and it is easily applied to arthritic patients where the splint may need to be fitted about a swollen hand bone projection with a good, close and delicate fit. This splint is more comfortable in the ability to transfer moisture through the close perforations, avoiding a wet clammy feeling about the encased body member while still retaining its functional body member supporting strength.

EXAMPLE II

The sheet of Example I, instead of being perforated, was knurled to form depressions in the surface of about one-thirty second of an inch depth to a surface covering as shown somewhat exaggeratedly in FIG. 2. This sheet, too, showed greatly improved comfort over a sheet having a continuous flat surface. The present example was repeated, except that the pattern was changed by impressing cups rather than knurlings as shown in FIG. 1. In a third experimental run the surface was textured as shown in FIG. 3 to produce a roughened fiber-like effect as irregularity upon the surface, again to a depth of about one-thirty-second of an inch, insufficient to significantly reduce the strength of the original sheet.

EXAMPLE III

The sheets as formed in Example I are immersed in n-hexane for a period of fifteen minutes, withdrawn and allowed to dry in air. The products are then packaged and ready for use. Upon use the sheet is warmed in a pan of warm water at a temperature of about 85 to 100° C. and the sheet softens and simultaneously develops a foamed surface on both sides. The foam has not homogeneously penetrated into the center, a structure illustrated in FIG. 7. In its softened condition the foamed sheet is wrapped about the body member of the patient and, upon cooling, will set to a strong cast and moisture absorptive body support member of great comfort and security to the user.

Following the procedure of this example, various solvents such as liquified petroleum gases, acetone and halogenated gases may be used as solvent, selected to avoid excessive solubility in substitution for the n-hexane, varying the temperature of the solution to adjust for the particular solubility of the plastic therein and simultaneously varying the time of immersion somewhat, merely to allow absorption of sufficient solvent in the polymer to provide for subsequent foaming upon heating. Such solvent, as stated, is evaporated to superficially dry the plastic sheet so that it may be stored until ready for use.

It is possible as shown in this example also to coat only one surface of the plastic by applying the solvent through rollers wet with the solvent, handling the plastic in continuous sheet form while maintaining the surface substantially wet by a series of rollers for a corresponding period of time. When only one surface of the sheet has been thus treated with solvent, upon subsequent warming of the sheet plastic only that treated surface will expand to porous form structure as shown in FIG. 5.

EXAMPLE IV

In a modified form as shown in FIGS. 6 and 8, the plastic in the liquid form can have a gas incorporated under high pressure and cast under high pressure with the gas trapped therein. Upon subsequent warming the sheet will expand to provide a homogeneous porous interior. It is possible that the warm gas-containing plastic can be cast in sheets of desired thickness and in porous form so that upon subsequent warming they do not foam or change in dimension in any way, since the foamed condition is already present in the sheets as they are distributed.

EXAMPLE V

Sheets as formed in Example I are soaked for two days in a saturated aqueous solution of ammonium carbonate in a closed container. They are then removed and warmed in a hot air oven using a thin glycerol layer to prevent sticking; and heating at 90° C. 760 torr for twenty minutes. Randomly shaped and sized surface indentations are found to result on the upper side, providing modified surface texturing. The face of the sheet splints thus formed with their surface adjacent to the skin does not have the uncomfortable characteristics due to a slimey moisture accumulation as described above.

EXAMPLE VI

In a modified form as shown in FIGS. 6-8, the plastic sheet is soaked for one half hour or longer in methanol and then superficially dried by wiping. The sheets are then warmed at 90° C. for two minutes in a glycerol bath. The pressure is then reduced to less than 10 mm. torr at 90° C. for ten minutes. The sheets are then cooled at atmospheric pressure. The resultant product had about one hundred porous openings in the surface per square inch of surface and provided direct void channels between the surfaces. Repetition of soaking and evaporation increases the porosity at a controllable rate. The resulting open foam structure can be softened by warming in water near the boiling point and formed into a rugged cast about a fractured or injured body member. It can be so retained in protective support for long periods of time without discomfort due to odor or moisture collection. Areas of discomfort due to chaffing, resulting from alterations of body contours on healing, can be rectified by warming isolated locations with a hot surface, such as a heat sealer commonly used in plastic packaging. A wrapper splint may be cut longitudinally with a common orthopedic rotary saw while cold, opened like a bivalve and converted to a removable splint without altering its contour-fitting qualities. The bivalve clam-like splint can be kept closed with exterior tapes, etc., as needed.

EXAMPLE VII

A solid sheet of plastic corresponding to that described in Example I is similarly made except that the polymer is low temperature polymerized polychloroprene. The sheet in an unaged condition is then soaked for several days in diethyl ether and foamed, after superficial drying, by heating for ten minutes in boiling water. The resultant product has a cellular structure and surface pores which improve its value as a splinting material. It is found that this product is useful for many static hand splints but needs external support in splints encountering stress such as in "cock up" splints for spastic wrists. It is preferred that the sheet for foaming be freshly prepared or that the surface be protected as described in my copending application.

EXAMPLE VIII

Example VII is repeated with a polymer sheet made as in Example I except that the plastic sheet contains fifty parts of transpolyisoprene or fifty parts of transpolychloroprene. The results obtained are similar with the product requiring external support in certain cases as described above, although the inclusion of ¼ inch fibers in quantity of one part as in my original composition greatly increases its strength, making it possible to use this as a cast for large fractures.

While as stated in Example I the sheets may contain reenforcing fiber, whatever the surface configuration, and that fiber will be necessary only where substantial perforation is applied, the fiber can be omitted with, however, some sacrifice of inherent strength including reduced tendency of the polymer sheet to creep when applied as a splint about a body member.

In applying the said sheet material, it may be warmed in a hot water bath sufficient to soften it. Where the sheet material includes a gas forming agent, it becomes foamy when warmed. The warming temperature usually is less than 110° C., but always is above the body temperatures, such as above 60° C., which is sufficient to activate the foaming agent for developing a foam in one or both surfaces, and sometimes throughout the entire body of the sheet material. Such sheets may be quite thin, having a thickness as low as 2 mils, ranging upward to 200 mils. However, it is most usual for body support to use a sheet having a thickness in the range of 100 to 150 mils. Upon warming, the sheet material becomes softened in a few minutes, sufficient to deform the entire sheet about the body member to be encased. It may be cut with a pair of scissors to the desired pattern or splint or protective cast as needed for the particular member to be supported. It is pressed about the body member for comfortable support with the surface having the irregularities or foam disposed adjacent to the skin of the body member being encased. The softened edges with firm pressure will cohere to each other, but the edges of the sheet may be slightly rewarmed as needed for improving the adhesion after assembling the sheet about the body member, if this is found to be necessary.

Other improvements as described and claimed in my parent application including desirable coatings may be used with the surface modified sheets hereof.

What is claimed is:

1. A sheet material adapted for medical use in the making of casts, splints or the like protective support element for a body member, having the property of being heat deformable and cold setting, comprising a polymer selected from the group consisting of transpolyisoprene and polychloroprene, said polymer sheet being hardenable to rigid hardness and free of substantial creep or deformation under long periods of use at temperature below about 40° C., and softenable by heat at temperatures above about 60° C., said sheet having at least its surface adjacent to the body member to be protected deformed to include structural irregularities in the surface, said irregularities being capable of absorbing continuous moisture films that may be developed upon the skin of the body member in contact therewith to be protected and when said irregularities consist of perforations, they are close-spaced a distance from each other less than ⅜ inch and are evenly distributed throughout the surface of said plastic to interrupt moisture films that may tend to deposit upon the skin.

2. The sheet material as defined in claim 1 wherein the surface irregularities are perforations extending entirely through the body of said sheet material from surface to surface, sized to provide less than about 10% of the total surface as evenly distributed perforations, said perforations being spaced a distance ranging from about ⅛ to ⅜ inch from each other in an even pattern.

3. The sheet material as defined in claim 1 having fibers homogeneously distributed throughout its body to impart dimensional stability and having a thickness in the range of about 2 to 200 mils, and the surface irregularities are perforations extending entirely through the body of said sheet material from surface to surface, sized to provide less than about 10% of the total surface as evenly distributed perforations, said perforations being spaced a distance ranging from about ⅛ to ⅜ inch from each other in an even pattern.

4. The sheet material as defined in claim 1 wherein the surface irregularities comprise cup-like depressions in at least one surface, and spaced from about ⅛ to ⅜ inch from each other in an even pattern.

5. The sheet material as defined in claim 1 wherein the surface irregularities comprise knurled depressions extending in an even pattern across the surface.

6. The sheet material as defined in claim 1 wherein the surface irregularities are provided by texturing, conforming to a woven pattern evenly distributed across at least one surface.

7. The sheet material as defined in claim 1 wherein the surface irregularities comprise foam formed by generation of gases adjacent to at least one surface.

8. The sheet material as defined in claim 1 wherein the surface irregularities comprise a foamed texture formed by generation of gases adjacent to both surfaces, the center portion of said foamed sheet material containing no foam.

9. The sheet material as defined in claim 1 wherein the surface irregularities comprise foam formed by generation of gases, said foamy structure extending throughout the body of said sheet material from surface to surface.

10. The sheet material as defined in claim 1 wherein the surface irregularities comprise foam formed by generation of gases in said sheet material, said foamy structure extending throughout the body of said sheet material from surface to surface, said foamy body comprising gas cells developed therein, said cells being interconnected to provide gas and vapor communication from surface to surface of said foamed body.

11. The sheet material as defined in claim 1 wherein the polymeric sheet material includes a foaming agent activatable with heat so that, upon warming the sheet body for softening sufficient to apply the sheet material as a body support member, the foaming agent is simultaneously activated to convert at least one surface of the sheet material to a foamy texture.

12. The sheet material as defined in claim 1 wherein the polymeric heat softenable plastic substance has been foamed to include gas bubbles disposed at and adjacent to one surface, the cellular structure thereof being retained when heating sufficient to soften said sheet material for application in the body support use.

References Cited

UNITED STATES PATENTS

| | | | |
|---|---|---|---|
| 2,373,802 | 4/1945 | Anderson | 128—90 |
| 2,616,418 | 11/1952 | Eberl | 128—90 |
| 3,398,035 | 8/1968 | Cleereman et al. | 161—161 X |
| 3,467,570 | 9/1969 | Baxter et al. | 161—159 X |
| 3,474,049 | 10/1969 | Chappelear et al. | 161—159 UX |
| 3,490,444 | 1/1970 | Larson | 260—17.4 BB |
| 3,196,062 | 7/1965 | Kristal | 156—79 |
| 1,534,527 | 4/1925 | Joseph | 161—164 X |
| 1,628,090 | 5/1927 | Weiss | 161—123 |
| 1,948,327 | 2/1934 | Berwick | 161—109 |
| 2,032,935 | 3/1936 | Hurt | 161—116 |
| 2,032,941 | 3/1936 | Linscott et al. | 161—109 |
| 2,362,340 | 11/1944 | Bacon | 161—164 X |
| 2,393,843 | 1/1946 | Cleef | 161—164 X |
| 2,634,243 | 4/1953 | Glenn | 260—2.5 R |
| 2,862,284 | 12/1958 | Wiczer | 161—180 X |
| 3,026,224 | 3/1962 | Rogers | 161—116 X |
| 3,070,476 | 12/1962 | Miller | 161—124 X |
| 3,215,436 | 11/1965 | Carter | 260—2.5 R |
| 3,444,036 | 5/1969 | Russell et al. | 264—53 XR |
| 3,524,794 | 8/1970 | Jonnes et al. | 260—1.5 R |
| 2,383,110 | 8/1945 | Cooper et al. | 264—41 X |
| 2,495,135 | 1/1950 | Rodman | 260—33.2 |
| 2,783,175 | 2/1957 | Smith et al. | 156—339 |
| 2,800,129 | 7/1957 | Van Swaay | 128—90 |
| 3,046,172 | 7/1962 | Reid | 161—160 |
| 3,048,169 | 8/1962 | Pierce | 264—222 |
| 3,154,605 | 10/1964 | Meyer et al. | 260—2.5 |
| 3,176,685 | 4/1965 | Smarook | 128—90 |
| 3,213,071 | 10/1965 | Campbell | 161—161 |
| 3,305,429 | 2/1967 | Stadden | 156—78 X |
| 3,389,199 | 6/1968 | Bushnell et al. | 260—2.5 X |

FOREIGN PATENTS 746,291  11/1966  Canada.

OTHER REFERENCES

Meyer, K. H.: Natural and Synthetic High Polymers, Interscience Pub., New York (1950), pp. 221 and 222 relied on.

MARION E. McCAMISH, Primary Examiner

U.S. Cl. X.R.

128—90; 161—112, 113, 116, 119, 159, 160; 260—17.4 BB